(12) United States Patent
Faust et al.

(10) Patent No.: US 12,167,150 B2
(45) Date of Patent: Dec. 10, 2024

(54) ELECTRONIC DEVICE AND METHOD FOR SPATIAL SYNCHRONIZATION OF VIDEOS

(71) Applicants: SONY GROUP CORPORATION, Tokyo (JP); SONY CORPORATION OF AMERICA, New York, NY (US)

(72) Inventors: Brent Faust, San Diego, CA (US); Cheng-Yi Liu, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 344 days.

(21) Appl. No.: 17/515,657

(22) Filed: Nov. 1, 2021

(65) Prior Publication Data

US 2023/0135230 A1 May 4, 2023

(51) Int. Cl.
*H04N 23/90* (2023.01)
*G06T 7/00* (2017.01)
(Continued)

(52) U.S. Cl.
CPC ............... *H04N 23/90* (2023.01); *G06T 7/38* (2017.01); *G06T 7/70* (2017.01); *G06T 7/80* (2017.01);
(Continued)

(58) Field of Classification Search
CPC ...... H04N 23/90; H04N 17/00; H04N 17/002; H04N 23/60; H04N 23/56; G06T 7/38; G06T 7/55; G06T 7/70; G06T 7/80; G06T 7/85; G06T 7/97; G06T 2207/10016; G06T 2207/10152; G06T 2207/20081;
(Continued)

(56) References Cited

U.S. PATENT DOCUMENTS

| 7,679,532 B2 * | 3/2010 | Karlsson | G05D 1/0231 340/988 |
| 9,743,010 B1 | 8/2017 | Edwards | |

(Continued)

OTHER PUBLICATIONS

Final Office Action for U.S. Appl. No. 17/464,781 dated Jan. 26, 2023.
(Continued)

*Primary Examiner* — Edward F Urban
*Assistant Examiner* — Benedict E Lee
(74) *Attorney, Agent, or Firm* — CHIP LAW GROUP

(57) ABSTRACT

An electronic device is provided that determines initial three-dimensional (3D) coordinates of a lighting device. The electronic device controls an emission of light from the lighting device based on control signals. The emitted light includes at least one of a pattern of alternating light pulses or a continuous light pulse. The electronic device controls a plurality of imaging devices to capture a first plurality of images that include information about the emitted light. Based on the determined initial 3D coordinates and the information about the emitted light included in the first plurality of images, the electronic device estimates a plurality of rotation values and a plurality of translation values of each imaging device. Based on the plurality of rotation values and the plurality of translation values, the electronic device applies a simultaneous localization and mapping process for each imaging device, for spatial synchronization of the plurality of imaging devices.

19 Claims, 6 Drawing Sheets

(51) Int. Cl.
*G06T 7/38* (2017.01)
*G06T 7/70* (2017.01)
*G06T 7/80* (2017.01)
*H04N 17/00* (2006.01)

(52) U.S. Cl.
CPC .............. *G06T 7/97* (2017.01); *H04N 17/002* (2013.01); *G06T 2207/10016* (2013.01); *G06T 2207/10152* (2013.01); *G06T 2207/20081* (2013.01); *G06T 2207/20084* (2013.01); *G06T 2207/30244* (2013.01)

(58) Field of Classification Search
CPC . G06T 2207/20084; G06T 2207/30244; G06T 7/73
See application file for complete search history.

(56) References Cited

U.S. PATENT DOCUMENTS

| | | | |
|---|---|---|---|
| 9,930,320 B2* | 3/2018 | Chen | H04N 13/239 |
| 10,445,898 B2 | 10/2019 | Liu et al. | |
| 11,288,844 B2* | 3/2022 | LeGendre | G06T 7/70 |
| 11,335,153 B1* | 5/2022 | Finley | G06N 3/08 |
| 11,475,589 B2* | 10/2022 | Tang | G06T 7/73 |
| 11,477,411 B1* | 10/2022 | Harfouche | H04N 23/698 |
| 11,585,931 B2* | 2/2023 | Remelius | G01S 5/163 |
| 11,629,835 B2* | 4/2023 | Kuffner, Jr. | G06T 7/90 362/466 |
| 2017/0048494 A1 | 2/2017 | Boyle et al. | |
| 2018/0035019 A1 | 2/2018 | Back et al. | |
| 2022/0070353 A1 | 3/2022 | Wester et al. | |

OTHER PUBLICATIONS

Zhao, et al., "High-precision synchronization of video cameras using a single binary light source", Journal of Electronic Imaging, vol. 4, No. 4, Oct. 1, 2009, 03 pages.

Mehrabi, et al., "Video Synchronization in the Cloud Using Visible Light Communication", pdfroom.com, Jan. 1, 2015, 93 pages.

Non-Final Office Action for U.S. Appl. No. 17/464,781 dated Oct. 5, 2022.

Notice of Allowance for U.S. Appl. No. 17/464,781 dated Apr. 5, 2023.

* cited by examiner

ELECTRONIC DEVICE AND METHOD FOR SPATIAL SYNCHRONIZATION OF VIDEOS

REFERENCE

None.

FIELD

Various embodiments of the disclosure relate to video synchronization. More specifically, various embodiments of the disclosure relate to an electronic device and a method for spatial synchronization of videos.

BACKGROUND

Typically, multiple imaging devices, such as cameras may be utilized to record multiple videos of an object or a scene from different viewpoints. Such recorded videos may be utilized in various industries for different purposes. For example, the recorded videos may be utilized for photogrammetry applications. In another example, the recorded video may be utilized for applications, such as scene reconstruction for augmented reality, virtual reality, three-dimensional (3D) object detection or motion capturing. Generally, the photogrammetry applications and computer graphics applications may require information about extrinsic parameters of each camera of the multiple cameras to accurately process the recorded videos. The extrinsic parameters of each camera may be determined by spatial synchronization (or calibration) of the multiple cameras. Conventional methods for the spatial synchronization may include manual execution of a labor-intensive setup, that may be difficult to implement and may not guarantee accuracy in the calibration of the multiple cameras. Moreover, conventional methods may utilize measurement targets, such as checkerboard patterned-boards and identifiable markers for the spatial synchronization of the multiple cameras, use of which may be time-consuming and inefficient to achieve the spatial synchronization of the multiple cameras.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method for spatial synchronization of videos, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
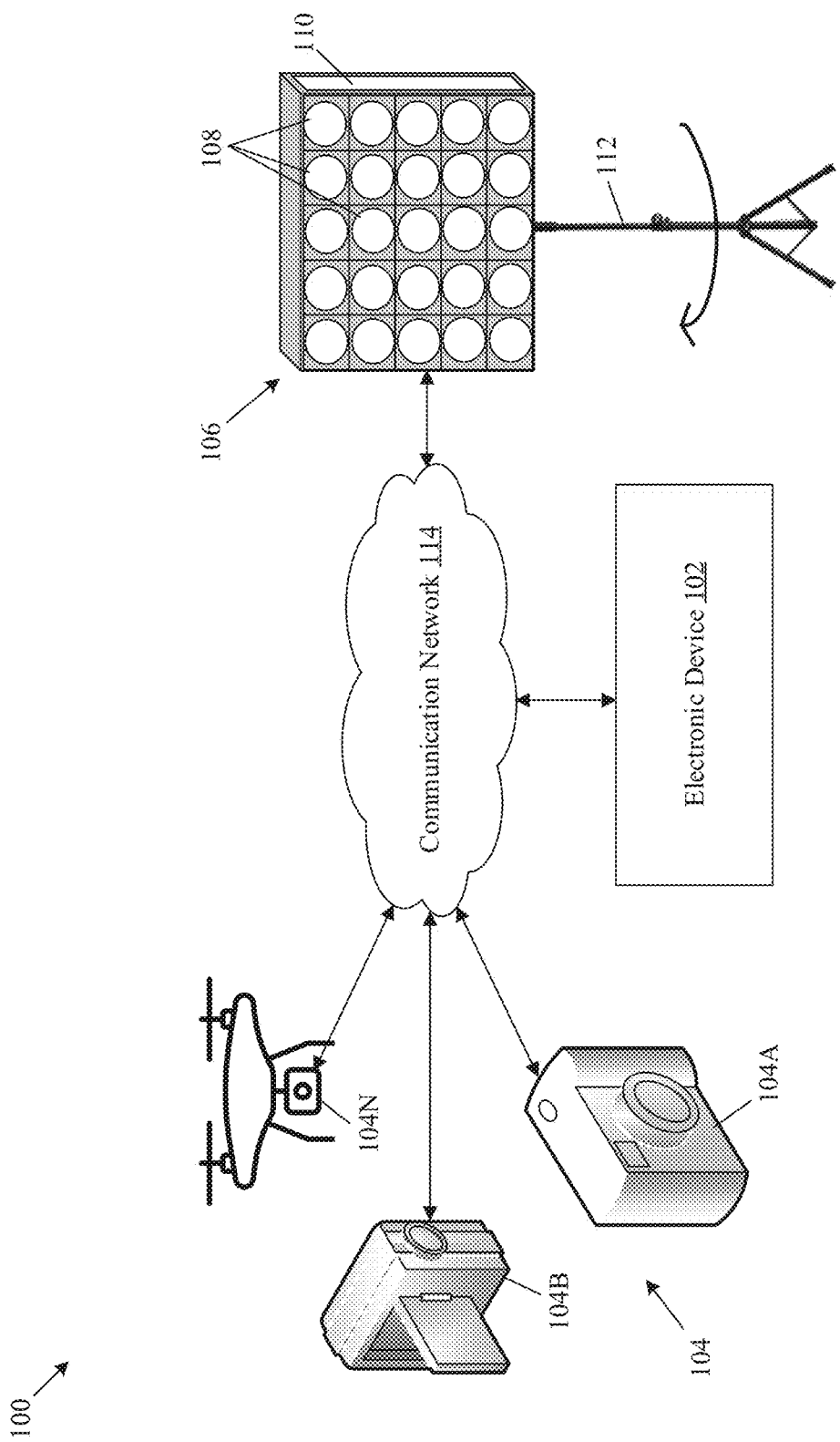
FIG. 1 is a block diagram that illustrates an exemplary network environment for spatial synchronization of videos, in accordance with an embodiment of the disclosure.

The following described implementations may be found in the disclosed electronic device and a method for spatial synchronization of a plurality of images (or videos) and capturing devices. Exemplary aspects of the disclosure provide an electronic device for the spatial synchronization of a plurality of imaging devices (for example, but are not limited to, digital cameras, video cameras and cameras mounted on drones and vehicles). The plurality of imaging devices may be utilized to record an object or a scene from a plurality of viewpoints. The electronic device may be configured to determine initial three-dimensional (3D) coordinates of a lighting device communicably coupled to the electronic device. The lighting device may include a grid of lights and an edge light. The determined 3D coordinates may be for example, global Cartesian coordinates of the lighting device in space. The electronic device may further control an emission of light from the lighting device based on one or more control signals. For example, the emission of light from one or more of the grid of lights and the edge light may be controlled. The emitted light may include at least one of a pattern of alternating light pulses or a continuous light pulse. The electronic device may further control the plurality of imaging devices to capture a first plurality of images that may include information about the emitted light. For example, the lighting device may be in a field-of-view of a respective imaging device of the plurality of imaging devices, while the plurality of imaging devices captures the first plurality of images.

In accordance with an embodiment, the one or more control signals may include a synchronization signal. The electronic device may control the emission of the light from the lighting device based on the synchronization signal to determine a first set of images of the first plurality of images. The electronic device may determine the first set of images of the first plurality of images that may include information about the pattern of alternating light pulses included in the emitted light. For example, the first set of images may include information about an ON pulse pattern and an OFF pulse pattern of the pattern of alternating light pulses.

The electronic device may further determine a center of each light of the grid of lights of the lighting device in a first set of frames of the first set of images. The first set of frames may include the ON pattern of the pattern of alternating light pulses. Based on the determined 3D coordinates, and the information about the pattern of alternating light pulses included in the emitted light and included in the first plurality of images, the electronic device may estimate a first rotation value and a first translation value of a plurality of rotation values and a plurality of translation values for each imaging device of the plurality of imaging devices.

In accordance with an embodiment, the electronic device may further control a transformation of each imaging device of the plurality of imaging devices for a first time period. For example, the transformation of each imaging device may include at least a rotation or a translation of each imaging device towards the lighting device. Each imaging device may capture a second set of images of the first plurality of images. The electronic device may further determine a center of each light, of the grid of lights of the lighting device, in the second set of images. The second set of images may include information about the emitted light that may include the continuous light pulse. Based on the determined 3D coordinates of the lighting device and the determined center of each light (i.e. of the grid of lights of the lighting device) in the second set of images, the electronic device may estimate a second rotation value and a second translation value of the estimated plurality of rotation values and the plurality of translation values, for each imaging device of the plurality of imaging devices. The electronic device may further apply a simultaneous localization and mapping (SLAM) process for each imaging device, based on the plurality of rotation values and the plurality of translation values, for accurate spatial synchronization of the plurality of imaging devices.

In conventional systems, the spatial synchronization (or calibration) of the plurality of imaging devices may require manual execution of a labor-intensive setup, that may be difficult to implement and may not guarantee accuracy in the spatial synchronization. However, the disclosed electronic device may enable calibration of the plurality of imaging devices by use of one single device (such as the lighting device). The light emitted by the lighting device may be utilized to spatially synchronize the plurality of imaging devices, thereby, providing an easy-to-implement setup that may guarantee accuracy in the calibration. Moreover, in the conventional systems, measurement targets, such as checkerboard patterned-boards and identifiable markers may be utilized for the spatial synchronization of the plurality of imaging devices, use of which may be time-consuming and inefficient to achieve the calibration. In contrast, the disclosed electronic device may eliminate a usage of the measurement targets to calibrate the plurality of imaging devices, and may further calibrate the plurality of imaging devices based on the determination of the extrinsic parameters (i.e. rotation and translation) of each imaging device based on the information included in the light emitted by the lighting device. Therefore, the disclosed electronic device may provide a time-effective and efficient spatial synchronization of the plurality of imaging devices.

FIG. 1 is a block diagram that illustrates an exemplary network environment for spatial synchronization of videos, in accordance with an embodiment of the disclosure. With reference to FIG. 1, there is shown a network environment 100. The network environment 100 may include an electronic device 102 and a plurality of imaging devices 104. The plurality of imaging devices 104 may include a first imaging device 104A, a second imaging device 104B, and an Nth imaging device 104N. The network environment 100 may further include a lighting device 106. The lighting device 106 may include a grid of lights 108, an edge light 110 and a rotatable stand 112. The network environment 100 may further include a communication network 114. The electronic device 102, the plurality of imaging devices 104 and the lighting device 106 may communicate with each other, via the communication network 114.

The electronic device 102 may include suitable logic, circuitry, interfaces, and/or code that may be configured to spatially synchronize (or calibrate) the plurality of imaging devices 104 and images/videos captured by the plurality of imaging devices 104. The electronic device 102 may be further configured to generate a synchronization signal that may be utilized for the spatial synchronization of the plurality of imaging devices 104. Examples of the electronic device 102 may include, but are not limited to, an imaging controller, a photography engine, a movie controller, a computing device, a smartphone, a cellular phone, a mobile phone, a gaming device, a mainframe machine, a server, a computer workstation, and/or a consumer electronic (CE) device.

The plurality of imaging devices 104 may include suitable logic, circuitry, and interfaces that may be configured to capture a plurality of images, such as the plurality of images of an object or a scene from different viewpoints. The plurality of imaging devices 104 may be further configured to capture the plurality of images of light emitted by the lighting device 106. Examples of the plurality of imaging devices 104 may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices. In some embodiments, one or more imaging devices (such as the Nth imaging device 104N) of the plurality of imaging devices 104 may be mounted on a drone to capture one or more images of the plurality of images. In an embodiment, one or more imaging devices of the plurality of imaging devices 104 may be mounted with a vehicle (such as a patrol vehicle).

The lighting device 106 may include suitable logic, circuitry, and interfaces that may be configured to emit the light that may include at least a pattern of alternating light pulses or a continuous light pulse. The lighting device 106 may be configured to emit the light based on one or more control signals that may include the synchronization signal generated by the electronic device 102. In an embodiment, the grid of lights 108 of the lighting device 106 may include a plurality of shaped (for example round-shaped) lights arranged in form of a grid or a matrix. In an embodiment, each light of the grid of lights 108 may be a light-emitting diode (LED), a focused light bulb, or any lighting element with a capability to emit a narrow beam light. The edge light 110 of the lighting device 106 may be an LED panel or a bulb/tube-light panel that may be arranged on one or more sides of the lighting device 106.

The communication network 114 may include a communication medium through which the electronic device 102, the plurality of imaging devices 104, and the lighting device 106 may communicate with each other. The communication network 114 may be one of a wired connection or a wireless connection. Examples of the communication network 114 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 114 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the plurality of imaging devices 104 may be utilized by a user (such as an imaging expert, a movie or video scene director, or a videographer) for different purposes, for example, to record a scene from different viewpoints. In an exemplary scenario, an area may be under surveillance or may be used for recording the scene within the area. The plurality of imaging devices 104 may be utilized by the user to monitor the area under surveillance or to record the scene. For example, the plurality of imaging devices 104 may include the CCTV camera (for example, a first imaging device 104A), a camera installed in the patrolling vehicle and camera installed in a drone, such as the Nth imaging device 104N. The electronic device 102 may be configured to determine initial three-dimensional (3D) coordinates of the lighting device 106. The lighting device 106 may include the grid of lights 108 and the edge light 110. The determined 3D coordinates may be for example, the global Cartesian coordinates of the lighting device 106 in space. The initial 3D coordinates may include an x-coordinate, a y-coordinate and a z-coordinate. For example, the electronic device 102 may determine the initial 3D coordinates with respect to reference Cartesian coordinates of the lighting device 106 in the space. Details of the determination of the initial 3D coordinates are further described, for example, in FIG. 4A.

The electronic device 102 may be further configured to control the emission of light from the lighting device 106 based on one or more control signals. For example, the emission of the light from one or more of the grid of lights 108 and the edge light 110 may be controlled based on one or more control signals. In an exemplary scenario, the electronic device 102 may control a transformation (such as a rotation and a translation) of the lighting device 106 towards each imaging device. The emitted light may include at least one of the pattern of alternating light pulses or the continuous light pulse. The electronic device 102 may further control the plurality of imaging devices 104 to capture the first plurality of images that may include information about the emitted light. The electronic device 102 may rotate or translate the lighting device 106 (using the rotatable stand 112 or using any rotatable or movable mechanism on which the lighting device 106 may be installed) towards each of the imaging device, such that the information about the emitted light may be recorded in the first plurality of images by each of the imaging device For example, the lighting device 106 may be in the field-of-view (FOV) of a respective imaging device of the plurality of imaging devices 104, while the plurality of imaging devices 104 capture the first plurality of images. Details of the control the emission of light from the lighting device 106 based on one or more control signals are further described, for example, in FIG. 4A-4C.

In accordance with an embodiment, the electronic device 102 may generate the synchronization signal. The synchronization signal may include a preamble pulse and a sequence of alternating ON and OFF pulses. The synchronization signal may be generated based on a set of parameters associated with each imaging device of the plurality of imaging devices 104. The set of parameters may include at least a frame rate of each imaging device of the plurality of imaging devices 104. Details of the generation of the synchronization signal are further described, for example, in FIG. 3.

In accordance with an embodiment, the one or more control signals may include or correspond to the generated synchronization signal. Thus, the electronic device 102 may control the emission of the light from the lighting device 106 based on the synchronization signal. In some embodiments, the electronic device 102 may activate the grid of lights 108 of the lighting device 106 to generate an ON pattern of the pattern of alternating light pulses included in the emitted light. The electronic device 102 may further deactivate the grid of lights 108 of the lighting device 106 to generate an OFF pattern of the pattern of alternating light pulses included in the emitted light. Similarly, the electronic device 102 may activate or deactivate the edge light 110 of the lighting device 106. Details of the control of the emission of the light from the lighting device 106 based on the synchronization signal are further described, for example, in FIG. 4A.

The electronic device 102 may further determine a first set of images of the first plurality of images that may include information about the pattern of alternating light pulses included in the emitted light. For example, the first set of images may include the information about the ON pulse pattern and the OFF pulse pattern of the pattern of alternating light pulses. The electronic device 102 may further determine a center of each light of the grid of lights 108 in the first set of frames of the first set of images. The first set of frames may include the ON pattern of the pattern of alternating light pulses. Based on the determined 3D coordinates, and the information about the pattern of alternating light pulses included in the emitted light included in the first plurality of images, the electronic device 102 may estimate a first rotation value and a first translation value of a plurality of rotation values and a plurality of translation values of each imaging device. Details of the estimation of the first rotation value and the first translation value are further described, for example, in FIG. 4C.

In accordance with an embodiment, the electronic device 102 may further control a transformation of each imaging device of the plurality of imaging devices 104 for a first time period. For example, the transformation of each imaging device may include at least the rotation or the translation of each imaging device towards the lighting device 106. The first time period may correspond to, for example, a few seconds or milliseconds. Each imaging device may capture a second set of images of the first plurality of images. The electronic device 102 may further determine a center of each light, of the grid of lights 108 of the lighting device 106, in the second set of images. The second set of images may include information about the emitted light that may include the continuous light pulse corresponding to the control signal. In some embodiments, the electronic device 102 may determine a set of features associated with each image of the second set of images. The set of features may be utilized to determine a correspondence between objects in the second set of images for calibration. Details of the capture of the second set of images are further described, for example, in FIG. 4C.

Based on the determined 3D coordinates of the lighting device 106 and the determined center of each light of the grid of lights 108 in the second set of images, the electronic device 102 may estimate a second rotation value and a second translation value of the estimated plurality of rotation values and the plurality of translation values, for each imaging device of the plurality of imaging devices 104. In some embodiments, the electronic device 102 may utilize the set of features for estimation of the second rotation value and the second translation value. The second rotation value and the second translation value may be indicative of one or more extrinsic parameters associated with each imaging device of the plurality of imaging devices 104. Details of the estimation of the second rotation value and the second translation value are further described, for example, in FIG. 4C. The electronic device 102 may further apply a simultaneous localization and mapping (SLAM) process for each imaging device, based on the plurality of rotation values and the plurality of translation values, for spatial synchronization of the plurality of imaging devices 104. Thus, the plurality of imaging devices 104 may be calibrated accurately, by utilization of the lighting device 106.

Figure 2:
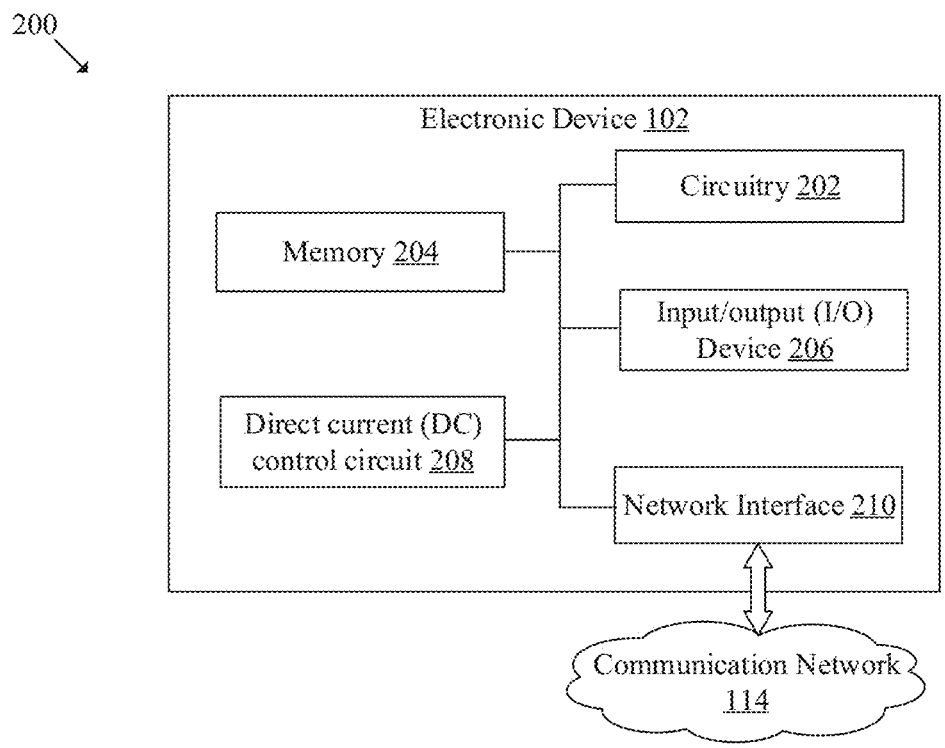
FIG. 2 is a block diagram that illustrates an exemplary electronic device for spatial synchronization of videos, in accordance with an embodiment of the disclosure.

FIG. 2 is a block diagram that illustrates an exemplary electronic device for spatial synchronization of videos, in accordance with an embodiment of the disclosure. With reference to FIG. 2, there is shown a block diagram 200 of the electronic device 102. The electronic device 102 may include circuitry 202, a memory 204, an input/output (I/O) device 206, a direct current (DC) control circuit 208, and a network interface 210.

The circuitry 202 may include suitable logic, circuitry, and/or interfaces, that may be configured to execute program instructions associated with different operations to be executed by the electronic device 102. For example, some of the operations may include control of an emission of light from the lighting device 106, control the plurality of imaging devices 104, estimation of a plurality of rotation values and translation values of each imaging device, and spatial synchronization of each imaging device of the plurality of imaging devices 104 based on the estimated plurality of rotation values and translation values. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store the one or more instructions to be executed by the circuitry 202. The memory 204 may be configured to store a plurality of images that may include information about the light emitted by the lighting device 106. In some embodiments, the memory 204 may be configured to store a set of parameters (such as intrinsic parameters) associated with the plurality of imaging devices 104. The memory 204 may further store the plurality of rotation values and the plurality of translation values of each imaging device of the plurality of imaging devices 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input and provide an output based on the received input. For example, the I/O device 206 may receive an input from a user to initiate the spatial synchronization of the plurality of imaging devices 104 (or the captured images). The I/O device 206 which may include various input and output devices, that may be configured to communicate with the circuitry 202. Examples of the I/O device 206 may include, but are not limited to, a touch screen, a keyboard, a mouse, a joystick, a microphone, a display device, and a speaker.

The DC control circuit 208 may include suitable logic, circuitry, and interfaces that may be configured to control drive of the lighting device 106. The DC control circuit 208 may receive the one or more control signal from the circuitry 202. The DC control circuit 208 may activate or deactivate the grid of lights 108 and the edge light 110 of the lighting device 106 based on the received one or more control signals. Based on the activation or deactivation of the lighting device 106, the lighting device 106 may emit the light. The DC control circuit 208 may further control a transformation (such as a rotation and a translation) of the lighting device 106 towards each imaging device. The DC control circuit 208 may further control the drive of the plurality of imaging devices 104 to initiate capture of the plurality of images that may include the information about the emitted light. In some embodiments, the DC control circuit 208 may be further configured to control the transformation (such as the rotation and the translation) of each imaging device of the plurality of imaging devices 104 towards the lighting device 106. In an exemplary embodiment, the DC control circuit 208 may be a bipolar junction transistor (BJT) based control circuit or a metal oxide semiconductor field effect transistor (MOSFET) based control circuit which may be used to drive the lighting device 106 or the plurality of imaging devices 104. In some embodiments, the DC control circuit 208 may be a part of the circuitry 202. Although in FIG. 2, the DC control circuit 208 is shown separated from the circuitry 202, the disclosure is not so limited. Accordingly, in some embodiments, the DC control circuit 208 may be integrated in the circuitry 202, without deviation from scope of the disclosure. In some embodiments, the DC control circuit 208 may be integrated in the lighting device 106 and may receive an activation signal or a deactivation signal (such as the control signal) from the circuitry 202, via the communication network 114, to activate of deactivate the grid of lights 108 and the edge light 110 of the lighting device 106.

The network interface 210 may comprise suitable logic, circuitry, and/or interfaces that may be configured to facilitate communication between the electronic device 102, the plurality of imaging devices 104, and the lighting device 106, via the communication network 114. The network interface 210 may be implemented by use of various known technologies to support wired or wireless communication of the electronic device 102 with the communication network 114. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5G communication, code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

A person of ordinary skill in the art will understand that the electronic device 102 in FIG. 2 may also include other suitable components or systems, in addition to the components or systems which are illustrated herein to describe and explain the function and operation of the present disclosure. A detailed description for the other components or systems of the electronic device 102 has been omitted from the disclosure for the sake of brevity. The operations of the circuitry 202 are further described, for example, in FIGS. 3, 4A, 4B and 4C.

Figure 3:
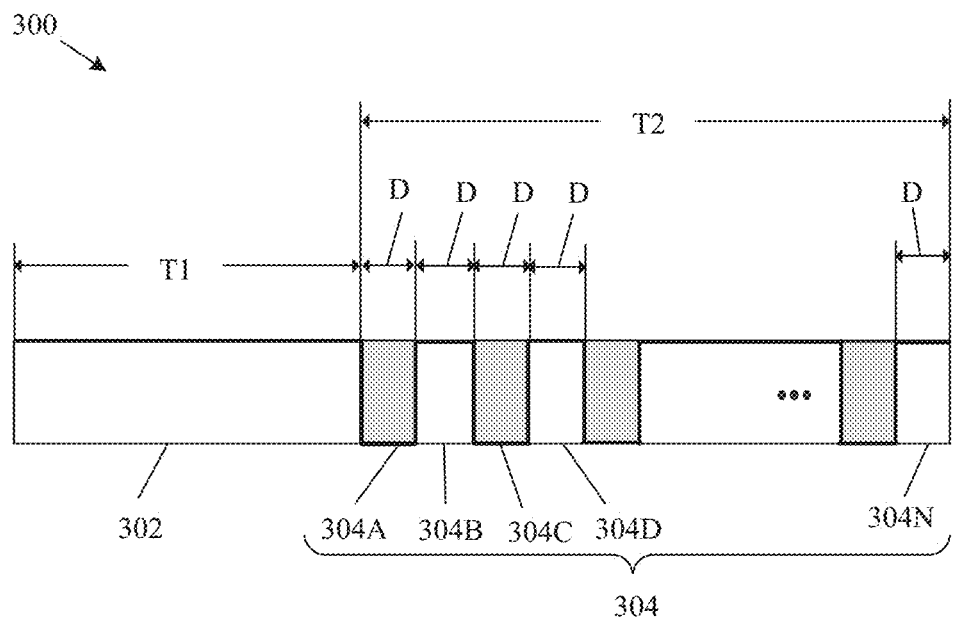
FIG. 3 is a diagram that illustrates an exemplary synchronization signal, in accordance with an embodiment of the disclosure.

FIG. 3 is a diagram that illustrates an exemplary synchronization signal, in accordance with an embodiment of the disclosure. FIG. 3 is explained in conjunction with elements from FIGS. 1 and 2. With reference to FIG. 3, there is shown an exemplary synchronization signal 300. The synchronization signal 300 may include a preamble pulse 302 and a sequence of alternating ON/OFF pulses 304. The sequence of alternating ON/OFF pulses 304 may include a first OFF pulse 304A, a first ON pulse 304B, a second OFF pulse 304C, a second ON pulse 304D, . . . , and an Nth ON pulse 304N.

The circuitry 202 may be configured to generate the synchronization signal 300 as the one or more control signals, for estimation of the first rotation value and the first translation value of the plurality of rotation values and the plurality of translation values. In some embodiments, the synchronization signal 300 may be a random sequence of alternate ON/OFF pulses. In accordance with an embodiment, the synchronization signal 300 may be based on a set of parameters associated with each imaging device of the plurality of imaging devices 104.

The circuitry 202 may be configured to determine the set of parameters associated with each imaging device of the plurality of imaging devices 104. The set of parameters may include at least the frame rate (in frames captured per second) of each imaging device. The set of parameters associated with each imaging device may further include, but not limited to, exposure information, shutter speed information, aperture information, sensitivity parameter, white balance information, focus information, and/or zooming information associated with each imaging device. In an example, a white balance of each imaging device may be OFF. In an embodiment, the focus information and the zooming information may be same and constant for each imaging device of the plurality of imaging devices 104. In some embodiments, the circuitry 202 may receive the set of parameters from respective imaging device of the plurality of imaging devices 104. In another embodiment, the set of parameters for each imaging device may be stored in the memory 204, and the circuitry 202 may further retrieve the set of parameters for each imaging device from the memory 204.

The circuitry 202 may be configured to generate the synchronization signal 300 that may include the preamble pulse 302 of a first time duration (such as a duration "T1") and the sequence of alternating ON and OFF pulses 304. Each pulse of the sequence of alternating ON and OFF pulses 304 may be of a second time duration (such as a duration "D", as shown in FIG. 3). In such a case, each pulse of the sequence of alternating ON and OFF pulses 304 may be of the same second time duration.

The first time duration may be based on the frame rate of each imaging device. The first time duration may be set such that the first time duration may be equal to or more than a time duration of one or more frames of the first plurality of images associated with or captured by the plurality of imaging devices 104. In other words, the first time duration may be set based on the total time duration (i.e. frame duration) of one or more frames captured by each of the plurality of imaging devices 104. For example, the frame rate of the first imaging device 104A may be 30 fps, and the frame rate of the second imaging device 104B may be 35 fps. In such a case, the first plurality of images captured by the first imaging device 104A may have 30 frames within a time period of "1" second and the first plurality of images captured by the second imaging device 104B may have 35 frames within the time period of "1" second. Thus, the first time duration ("T1") may be a sum of the time duration of at least one frame (i.e. 33.33 milliseconds) captured by the first imaging device 104A and the time duration of at least one frame (i.e. 28.6 milliseconds) captured by the second imaging device 104B. The circuitry 202 may set the first time duration ("T1") in few seconds, for example, 1-10 seconds. Thus, the preamble pulse 302 may be a long duration pulse.

The second time duration of each pulse of the sequence of alternating ON and OFF pulses 304 may be based on one or more parameters of the determined (or retrieved) set of parameters associated with each imaging device. The circuitry 202 may determine the second time duration, such as to achieve sub-frame timing accuracy. The second time duration may be based on equation (1) as follows:

$$D = n_i \tau_i + p_i \quad (1)$$

where D is the second time duration, $\tau_i$ is a time period of each frame of the first plurality of images and "i" represent an imaging device (such as the first imaging device 104A).

Further, $\tau_i = p_i \times q_i \quad (2)$ where $q_i$ is a first positive integer value, $n_i$ is a second positive integer value corresponding to the imaging device (such as the first imaging device 104A), and $p_i$ is an integer corresponding to a resolution of a subframe accuracy in milliseconds (msec) associated with the imaging device (such as the first imaging device 104A).

In accordance with an embodiment, the set of parameters may include the first positive integer value and the second positive integer value corresponding to each imaging device of the plurality of imaging devices 104. The circuitry 202 may be further configured to determine the first positive integer value and the second positive integer value based on the corresponding frame rate of each imaging device of the plurality of imaging devices 104.

In an exemplary scenario, the frame rate of the first imaging device 104A may be $f_i$ fps. Thus, the time period $\tau_i$ of each frame of the first plurality of images may be $1000/f_i$ milliseconds. Based on the frame rate of the first imaging device 104A, the circuitry 202 may determine the time period $\tau_i$ for the first imaging device 104A. The circuitry 202 may further determine the integer $p_i$, based on the resolution of the first imaging device 104A and further determine the first positive integer value $q_i$ utilizing equation 2.

Furthermore, the circuitry 202 may determine the second positive integer value $n_i$, based on a number of frames of the first plurality of images that may include the OFF pulse pattern of the sequence of alternating ON and OFF pulses 304 or the ON pulse pattern of the sequence of alternating ON and OFF pulses 304. In an embodiment, the $n_i$ indicates the number of frames of the first plurality of images (i.e. captured by a particular imaging device) that may be included or counted in the second time duration ("D"). For example, in case the second time duration ("D") is of 2000 msec and $\tau_i$ is 480 msec, then $n_i$ may be four, indicating that the four number of image frames may be included in the second time duration ("D").

The circuitry 202 may be determine the second time duration (D) of each pulse of the sequence of alternating ON and OFF pulses 304 based on the frame rate $f_i$, the determined first positive integer value $q_i$, and the determined second positive integer value $n_i$ associated with each imaging device of the plurality of imaging devices 104 by utilization of equation 1. Each of the determined first positive integer value and the determined second positive integer value may correspond to the set of parameters. For example, in case the second time duration ("D") is 2000 msec and the frame timing ($\tau_i$) of images captured by the first imaging device 104A is 480 msec, then $n_i$ may be "4", $p_i$ may be "80" and $q_i$ may be "6" based on equations (1) and (2). Similarly, based on known or predefined values of $\tau_i$, $n_i$, $p_i$, and $q_i$, the second time duration ("D") may be determined based on use of equations (1) and (2). In some embodiments, the second time duration (D) may be determined utilizing a Chinese remainder theorem when the integer $p_i$ and the time period $\tau_i$ may be natural numbers. In one or more embodiments, the second time duration (D) may be determined by utilizing a least common multiple (LCM) and a greatest common divisor (GCD) of fractions when the time period $\tau_i$ may be a rational number.

In accordance with an embodiment, a total duration (such as a duration "T2" shown in FIG. 3) of the sequence of alternating ON and OFF pulses 304 of the synchronization signal 300 may be based on one or more parameters of the set of parameters. The set of parameters may further include a third positive integer value that may correspond to the one or more parameters of the set of parameters. The third positive integer value "m" may be determined based on a tradeoff between a synchronization time and accuracy of the synchronization of the images captured by the plurality of imaging devices 104. In some embodiments, the higher a value of the third positive integer value "m", the higher may be the accuracy of the synchronization and higher may be a time required for the synchronization of the images. For example, the higher the value of the third positive integer value "m", the larger may be the total duration "T2" of the sequence of alternating ON and OFF pulses 304 of the synchronization signal 300. In such a case, determination of the pattern of ON and OFF pulses corresponding to the sequence of alternating ON and OFF pulses 304 in the captured images may be more time consuming as additional pulses of the pattern of ON and OFF pulses may be determined for the synchronization. However, such a determination of the additional pulses of the pattern of ON and OFF pulses may also ensure more accuracy, as the determination of more number of pulses may ensure that the pattern of ON and OFF pulses may be correctly determined in the captured images, thereby, reducing a false positive rate.

In accordance with an embodiment, the circuitry 202 may be further configured to determine the total duration ("T2") of the sequence of alternating ON and OFF pulses 304 of the synchronization signal 300 based on the determined first positive integer value and the third positive integer value. The total duration ("T2") may be calculated based on equation (3), as follows:

$$T2 = m*N \quad (3)$$

where "N"=max $q_i$. In an embodiment, "N" may be determined based on a maximum value of the first positive integer value $q_i$ corresponding to each imaging device of the plurality of imaging devices 104. Thus, the circuitry 202 may utilize equations (1), (2), and (3) to generate the synchronization signal 300.

Figure 4A:
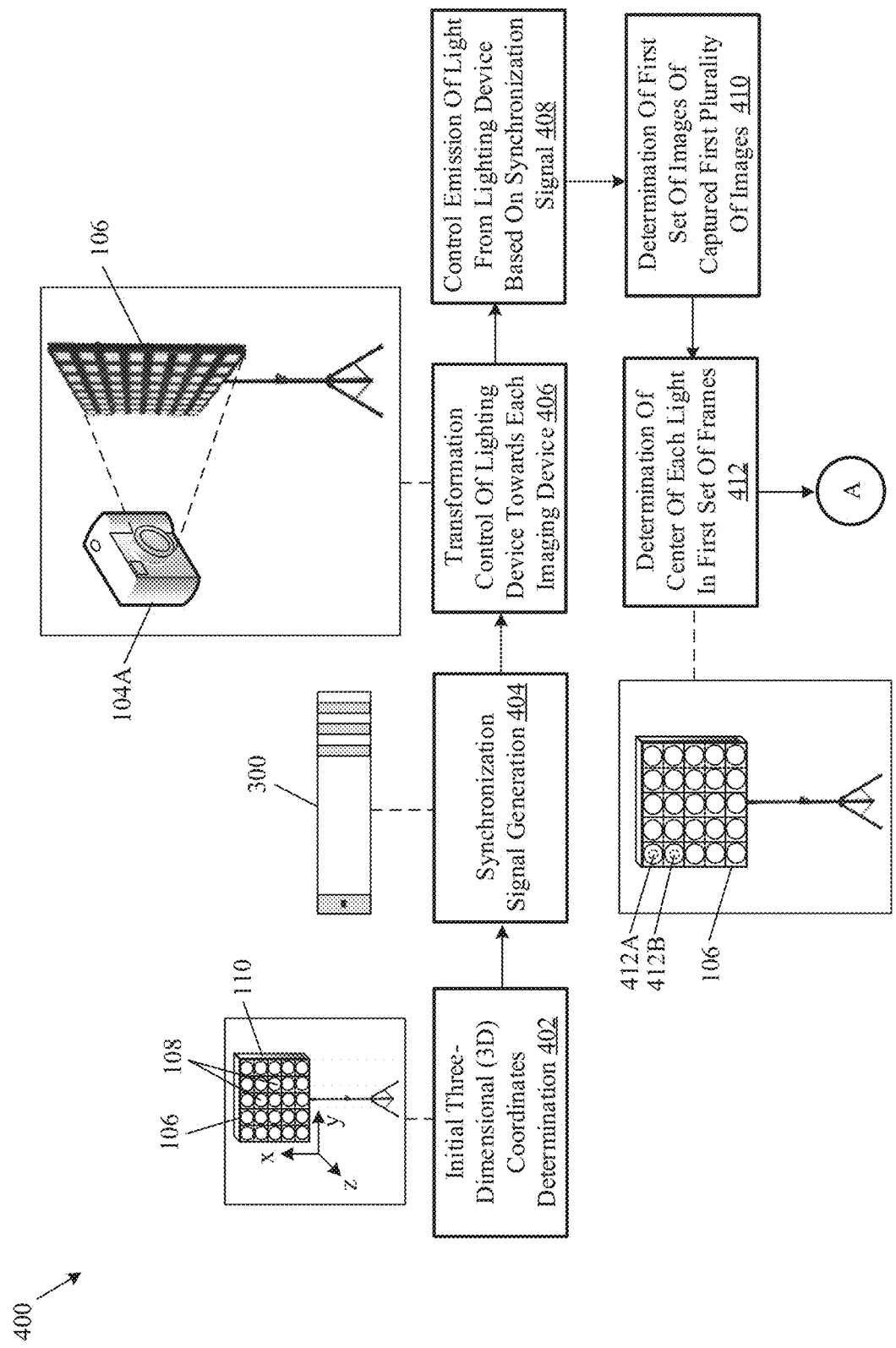
FIGS. 4A-4C collectively illustrate a diagram for exemplary operations for spatial synchronization of videos, in accordance with an embodiment of the disclosure.
Figure 4B:
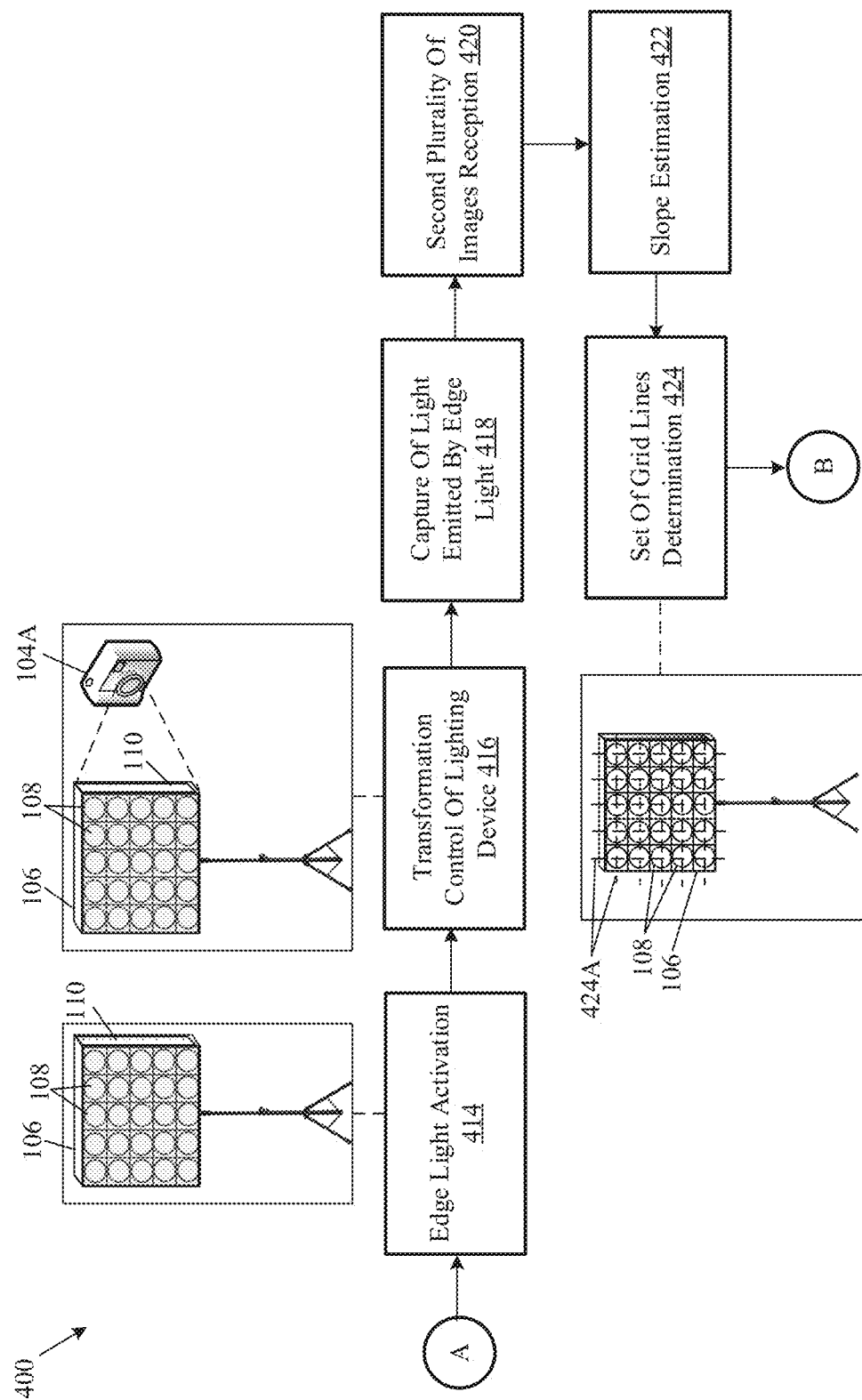
Figure 4C:
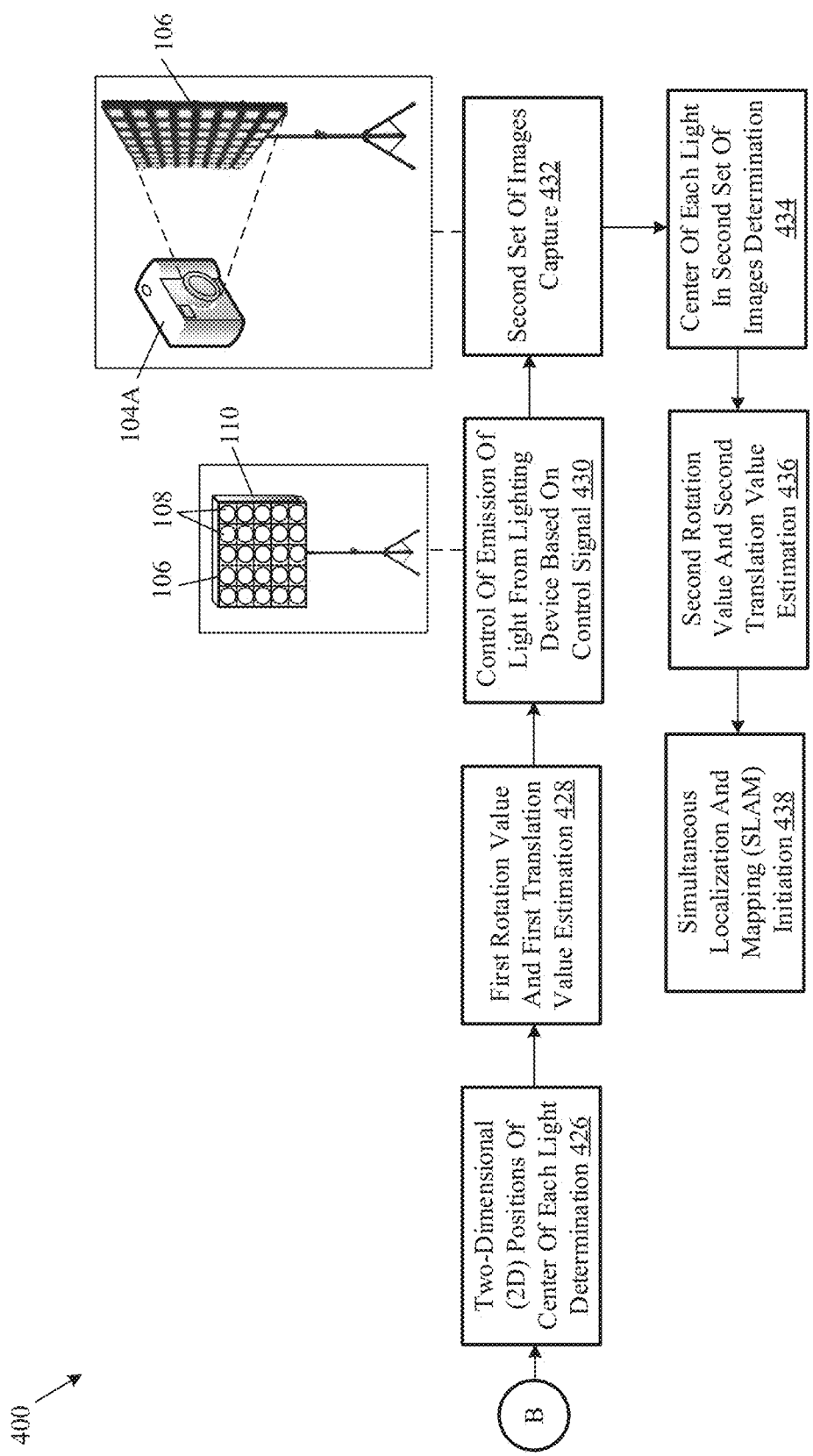

FIGS. 4A-4C collectively illustrates a diagram for exemplary operations for spatial synchronization of videos, in accordance with an embodiment of the disclosure. FIGS. 4A-4C are explained in conjunction with elements from FIGS. 1, 2 and 3. With reference to FIGS. 4A-4C, there is shown a diagram 400. The diagram 400 may illustrate exemplary operations from 402 to 438, as described herein. The exemplary operations illustrated in the block diagram 400 may start at 402 and may be performed by any computing system, apparatus, or device, such as by the electronic device 102 of FIG. 1 or the circuitry 202 of FIG. 2. Although illustrated with discrete blocks, the exemplary operations associated with one or more blocks of the block diagram 400 may be divided into additional blocks, combined into fewer blocks, or eliminated, depending on implementation of the exemplary operations.

At 402, the circuitry 202 may be configured to determine the initial 3D coordinates of the lighting device 106. The lighting device 106 may include the grid of lights 108 and the edge light 110 (as shown in FIG. 1). In an embodiment, the initial 3D coordinates may be the Cartesian coordinates, that may include the x-coordinate, the y-coordinate and the z-coordinate of a position of the lighting device 106 in the space. The circuitry 202 may determine the initial 3D coordinates of the lighting device 106, based on reference coordinates. The reference coordinates may be determined based on a position of the grid of lights 108 or the edge light 110 of the lighting device 106 with respect to the rotatable stand 112 (shown in FIG. 1) of the lighting device 106.

In an exemplary scenario, the grid of lights 108 and the edge light 110 of the lighting device 106 may be parallel to the rotatable stand 112. In such a case, the reference coordinates of the lighting device 106 may be (x, y, z)=(0,0,0) and the 3D coordinates (0,0,0) may be the reference coordinates of the lighting device 106. The lighting device 106 may be rotated and/or translated by rotation or translation, respectively, of a portion of the rotatable stand 112, such as that portion is attached to the lighting device 106. The lighting device 106 may be positioned at different angles by transformation (such as rotation or translation) of the rotatable stand 112 to transform the grid of lights 108 and the edge light 110 of the lighting device 106 towards each imaging device. The lighting device 106 may be transformed with respect to the plurality of imaging devices 104 which may be positioned in front or at certain angle of the lighting device 106. For example, the grid of lights 108 may be rotated towards the first imaging device 104A, to enable the first imaging device 104A to capture the light emitted by the grid of lights 108 of the lighting device 106. In another example, the edge light 110 may be rotated or translated towards the first imaging device 104A, to enable the first imaging device 104A to capture the light emitted by the edge light 110 of the lighting device 106. The initial 3D coordinates may be determined, that may remain fixed with respect to the space. In an embodiment, the reference coordinates (0,0,0) may be the initial 3D coordinates of the lighting device 106. The initial 3D coordinates of the lighting device 106 may be utilized to determine the rotation value and the translation value of each imaging device of the plurality of imaging devices 104.

At 404, the circuitry 202 may be configured to generate the synchronization signal 300. The synchronization signal 300 may include the preamble pulse 302 and the sequence of alternating ON and OFF pulses 304. In accordance with an embodiment, the generation of the synchronization signal 300 may be based on the set of parameters associated with each imaging device of the plurality of imaging devices 104. The set of parameters may include at least the frame rate of each imaging device of the plurality of imaging devices 104. Details of the generation of the synchronization signal 300 are further described, for example, in FIG. 3.

At 406, the circuitry 202 may control the transformation (such as the rotation and/or the translation) of the lighting device 106 towards each imaging device of the plurality of imaging devices 104. For example, each imaging device may be installed at different locations (i.e. close or at certain distance to the lighting device 106), to capture a scene from different viewpoints. The circuitry 202 may send a communication signal or a command to the lighting device 106, to further rotate and translate the lighting device 106 such that the grid of lights 108 of the lighting device 106 may be in a field-of-view (FOV) of each imaging device. In other words, the circuitry 202 may control the transformation of the lighting device 106 in a manner that the lighting device 106 may face towards each imaging device of the plurality of imaging devices 104 one by one. For example, the circuitry 202 may control the transformation of the lighting device 106 towards the first imaging device 104A (as shown in FIG. 4A), then towards the second imaging device 104B, and so on.

At 408, the circuitry 202 may control an emission of light from the lighting device 106 based on the one or more control signals. In accordance with an embodiment, the circuitry 202 may control the emission of light from the lighting device 106 based on the generated synchronization signal 300. The one or more control signals may include the synchronization signal 300. The emitted light may include the pattern of alternating light pulses corresponding to the synchronization signal 300. For example, the pattern of alternating light pulses may include a preamble pulse pattern corresponding to the preamble pulse 302, an ON pattern corresponding to the ON pulses of the sequence of alternating ON and OFF pulses 304, and an OFF pattern corresponding to the OFF pulses of the sequence of alternating ON and OFF pulses 304.

In accordance with an embodiment, the circuitry 202 may activate the grid of lights 108 of the lighting device 106 to generate the ON pattern of the pattern of alternating light pulses included in the emitted light. The circuitry 202 may also deactivate the grid of lights 108 of the lighting device 106 to generate the OFF pattern of the pattern of alternating light pulses included in the emitted light. In a situation, where the grid of lights 108 is activated, the edge light 110 of the lighting device 106 may be deactivated. Thus, the light that may include the pattern of alternating light pulses may be emitted by the grid of lights 108 of the lighting device 106. For example, the circuitry 202 may activate the grid of lights 108 for the second time duration "D", to generate the ON pattern. Further, the circuitry 202 may deactivate the grid of lights 108 for the second time duration "D", to generate the OFF pattern. Similarly, the circuitry 202 may activate the grid of lights 108 for the first time duration "T1" to generate the preamble pulse 302. The circuitry 202 may activate the grid of lights 108 and deactivate the grid of lights 108 sequentially for the total duration "T2", to generate the sequence of alternating ON and OFF pulses 304 of the synchronization signal 300.

At 410, the circuitry 202 may control each of the plurality of imaging devices 104 to capture a first plurality of images that may include information about the emitted light. For example, the first plurality of images may include the information about the emitted light (i.e. related to the synchronization signal 300) and a portion of the recorded scene by the plurality of imaging devices 104. In accordance with an embodiment, the circuitry 202 may determine a first set of images from the first plurality of images that may include the information about the pattern of alternating light pulses included in the emitted light. The first set of images may include the information about the ON pattern of the pattern of alternating light pulses as well as the OFF pattern of the pattern of alternating light pulses.

In accordance with an embodiment, the circuitry 202 may be configured to control the plurality of imaging devices 104 to capture the first set of images based on a determination that the lighting device 106 may be in the field-of-view of a respective imaging device of the plurality of imaging devices 104. For example, the circuitry 202 may control the transformation of the lighting device 106 towards the first imaging device 104A (as described at 408), such that the lighting device 106 may be in the field-of-view of the first imaging device 104A. In other words, the first imaging device 104A may be able to see or capture the complete lighting device 106 when the grid of lights 108 are turned-on and the lighting device 106 are transformed towards the first imaging device 104A. The circuitry 202 may further control the first imaging device 104A to capture the first set of images of the first plurality of images. Similarly, the circuitry 202 may control the transformation of the lighting device 106 towards the second imaging device 104B (at 408), such that the lighting device 106 may be in the field-of-view of the second imaging device 104B. The circuitry 202 may further control the second imaging device 104B to capture the first set of images of the first plurality of images. In such a manner, the circuitry 202 may capture the first set of images from each imaging device of the plurality of imaging devices 104.

At 412, the circuitry 202 may be configured to determine a center of each light of the grid of lights 108 in a first set of frames of the first set of images. The first set of frames may include the ON pattern of the pattern of alternating light pulses. For example, the circuitry 202 may determine the center of each light, such as a first light 412A of the grid of lights 108 and the center of a second light 412B of the grid of lights 108. The circuitry 202 may further determine an end of the preamble pattern corresponding to the preamble pulse 302 based on a stored framing offset corresponding to each imaging device. The circuitry 202 may select the first set of frames, based on an identification of a frame that may include the stored framing offset. The pattern of alternating light pulses may be included in the frames (of the first plurality of images) that may come after the frame that includes the framing offset in a sequence. Thus, the circuitry 202 may select the first set of frames from the frames that may come after the frame that includes the framing offset.

In an exemplary scenario, each light of the grid of lights 108 may be a circular shaped light. The circuitry 202 may determine the center of each light of the grid of lights 108 of the lighting device 106 based on a light intensity in each frame of the first set of frames. For example, the emitted light at the center of each light of the grid of lights 108 may have a maximum light intensity as compared to surrounding portions of each light of the grid of lights 108. The circuitry 202 may determine the light intensity in each pixel of each frame of the first set of frames to determine the center of each light of the grid of lights 108. In an embodiment, the circuitry 202 may determine a set of pixels in each frame corresponding to the maximum light intensity as the center of each light of the grid of lights 108. Thus, based on the determined light intensity, the circuitry 202 may determine the center for each light of the grid of lights 108.

In accordance with an embodiment, the circuitry 202 may be configured to apply a set of post-processing operations on the first set of frames of the first set of images. The set of post-processing operations may include, for example, a filtering operation. The circuitry 202 may filter-out one or more frames of the first set of frames that may have the light intensity less than a threshold value. In some embodiments, the circuitry 202 may further determine the center of each light of the grid of lights 108 of the lighting device 106 in the post-processed first set of frames of the first set of images. In some embodiments, the set of post-processing operations may further include, but is not limited to, a pixel-level filtering operation for each of the first set of frames (such as including a noise removal operation, a contrast enhancement operation, and/or an edge smoothing operation).

In an exemplary scenario, a frame of the first set of frames may include a first portion of the ON pattern and a second portion of the OFF pattern of the pattern of alternating light pulses. The circuitry 202 may determine that the first portion of the ON pattern may be less than the second portion of the OFF pattern of the pattern of alternating light pulses, based on the determined light intensity in the frame. Such frame may be invaluable in the determination of the center of each light of the grid of lights 108. Thus, based on the determination, the circuitry 202 may apply the filtering operation to eliminate such frame from the first set of frames. The circuitry 202 may determine the center of each light of the grid of lights 108 in the post-processed first set of frames.

In accordance with an embodiment, the circuitry 202 may be configured to apply a neural network model (not shown) on the first set of frames of the first set of images to determine a first frame. The circuitry 202 may further determine the center of each light of the grid of lights 108 of the lighting device 106 in the determined first frame of the first set of frames.

The neural network model may be a computational network or a system of artificial neurons, arranged in a plurality of layers, as nodes. The plurality of layers of the neural network model may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network model. Such hyper-parameters may be set before, while training, or after training of the neural network model on a training dataset.

Each node of the neural network model may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network model. All or some of the nodes of the neural network model may correspond to same or a different same mathematical function. In training of the neural network model, one or more parameters of each node of the neural network model may be updated based on whether an output of the final layer for a given input (from the training dataset) matches a correct result based on a loss function for the neural network model. The above process may be repeated for same or a different input till a minima of loss function may be achieved, and a training error may be minimized. Several methods for training are known in art, for example, gradient descent, stochastic gradient descent, batch gradient descent, gradient boost, meta-heuristics, and the like.

The neural network model may include electronic data, which may be implemented as, for example, a software component of an application executable on the electronic device 102. The neural network model may rely on libraries, external scripts, or other logic/instructions for execution by a processing device, such as the circuitry 202. The neural network model may include code and routines configured to enable a computing device, such as the circuitry 202 to perform one or more operations for determination of the first frame of the first set of frames. Additionally or alternatively, the neural network model may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model may be implemented using a combination of hardware and software. Examples of the neural network model may include, but are not limited to, a deep neural network (DNN), a convolutional neural network (CNN), a recurrent neural network (RNN), a CNN-recurrent neural network (CNN-RNN), an artificial neural network (ANN), a generative adversarial network (GAN), a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, and/or a combination of such networks. In some embodiments, the learning engine may include numerical computation techniques using data flow graphs. In certain embodiments, the neural network model may be based on a hybrid architecture of multiple Deep Neural Networks (DNNs).

The circuitry 202 may train the neural network model to determine the first frame based on input of the first set of frames of the first set of images. In some embodiments, the circuitry 202 may apply an average function to determine the first frame of the first set of frames to determine the center of each light of the grid of lights 108 of the lighting device 106.

With respect to FIG. 4B, at 414, the circuitry 202 may be configured to activate the edge light 110 of the lighting device 106. The edge light 110 may be activated to emit light, such as a continuous light pulse. In some embodiments, the circuitry 202 may deactivate the grid of lights 108 of the lighting device 106 at the time of activation of the edge light 110. The edge light 110 may be activated based on an electrical signal (such as a control signal) transmitted from the circuitry 202 of the electronic device 102. In an embodiment, the circuitry 202 may be configured to control a light intensity of the edge light 110 at which the edge light 110 may emit the continuous light pulse.

At 416, the circuitry 202 may further control the transformation of the lighting device 106 towards each imaging device of the plurality of imaging devices 104. The transformation may include at least one of the rotation or the translation of the lighting device 106. The circuitry 202 may control the transformation of the lighting device 106 such that the edge light 110 of the lighting device 106 may be in the field-of-view of the plurality of imaging devices 104. In an exemplary scenario, the circuitry 202 may control the rotation and/or translation of the lighting device 106, such that the edge light 110 may be in the field-of-view of the first imaging device 104A. Similarly, the circuitry 202 may further control the rotation and/or translation of the lighting device 106, such that the edge light 110 may be in the field-of-view of the second imaging device 104B, and so on. Thus, the circuitry 202 may control the rotation and/or translation of the lighting device 106 to enable the plurality of imaging devices 104 to capture the continuous light pulse emitted from the edge light 110.

At 418, the circuitry 202 may control the plurality of imaging devices 104 to capture light emitted by the edge light 110, based on the transformation of the lighting device 106. The circuitry 202 may activate the plurality of imaging devices 104 to capture the light emitted by the edge light 110. In some embodiments, the plurality of imaging devices 104 may be manually activated to capture the light emitted by the edge light 110.

At 420, the circuitry 202 may be configured to receive, from the plurality of imaging devices 104, a second plurality of images captured by the plurality of imaging devices 104. The received second plurality of images may include information about the light emitted by the edge light 110. In some embodiments, the second plurality of images may include one or more images that may exclude the information about the light emitted by the edge light 110. For example, the first imaging device 104A may be activated for a period of "5" seconds, and the edge light 110 may emit the light for a period of "3" seconds. In such a case, the second plurality of images may include one or more images captured for an additional period of "2" seconds, that may exclude the information about the light emitted by the edge light 110. The circuitry 202 may utilize a sharp contrast in the light intensity (such as brightness) in the second plurality of images to identify such one or more images that may exclude the information about the light emitted by the edge light 110. The circuitry 202 may further exclude the identified one or more images that may exclude the information about the light emitted by the edge light 110. In such a manner, the circuitry 202 may determine the second plurality of images that may include the information about the light emitted by the edge light 110.

At 422, the circuitry 202 may be configured to estimate a slope of the information about the light emitted by the edge light 110 in the second plurality of images captured by the plurality of imaging devices 104. For example, the information about the light emitted by the edge light 110 may be different in each of the second plurality of images captured by respective imaging device. For example, the circuitry 202 may control the transformation of the lighting device 106, such that the lighting device 106 may be at a first angle with respect to the first imaging device 104A. In such a case, the information about the light emitted by the edge light 110 in the second plurality of images (i.e. captured by the first imaging device 104A) may correspond to be at the first angle. Similarly, the information about the light emitted by the edge light 110 in the second plurality of images (i.e. captured by the second imaging device 104B) may correspond to be at another angle different than the first angle (i.e. corresponding to the first imaging device 104A). The circuitry 202 may determine the slope of the information about the light emitted by the edge light 110, based on a shape of the light (i.e. emitted by the edge light 110) captured in the second plurality of images.

At 424, the circuitry 202 may be configured to determine a set of grid lines 424A passing through the determined center of each light of the grid of lights 108 of the lighting device 106 in the first set of frames, based on the estimated slope of the information about the light emitted by the edge light 110 in the second plurality of images. The set of grid lines 424A may correspond to a set of vertical lines and a set of horizontal lines passing through the center of each light of the grid of lights 108.

In accordance with an embodiment, the circuitry 202 may be configured to determine the set of grid lines 424A passing through the determined center of each light of the grid of lights 108 in the first set of frames, based on a mathematical optimization function. For example, the mathematical optimization function may be based on an argmin function. The mathematical optimization function may be defined using equation (4) as follows:

$$L^* = \arg\min_L E_{pass}(\forall\, l \in L,\, I_{p \in l}) + E_{slope}(\forall\, l \in L,\, l' \in N(l)) \quad (4)$$

where "L" may represent the set of grid lines 424A, constrained by the estimated slope of the information about the light emitted by the edge light 110 in the second plurality of images. "I" may represent the information about the light of the grid of lights 108 in the first set of images. $I_{p \in l}$ may represent the light intensity of a pixel passing through "l".

In an embodiment, $E_{pass}(I_{p \in l})$ may be a smaller quantity, if $I_{p \in l}$ may be a bigger quantity. Further, N (I) may be neighboring lines of "l" in a same dimension of a pattern of the set of grid lines 424A. Moreover, $E_{slope}$ (l, l') may be a smaller quantity if directions of "l" and "l'" may close in the second plurality of images. Based on the equation (4), the circuitry 202 may determine the set of grid lines 424A.

In accordance with an embodiment, the circuitry 202 may determine the set of grid lines 424A passing through the determined center of each light of the grid of lights 108 in the first set of frames based on the neural network model. For example, the neural network model may be the same neural network model used to determine the first frame of the first set of frames (i.e. described at 412). In some embodiments, the circuitry 202 may utilize a transform function, such as Hough transform function to determine the set of grid lines 424A passing through the determined center of each light of the grid of lights 108 in the first set of frames.

With respect to FIG. 4C, at 426, the circuitry 202 may be configured to determine one or more projected 2D positions of the center of each light in the first set of frames, based on an intersection of the determined set of grid lines 424A. For example, the intersection of the determined set of grid lines 424A may coincide with the center of each light in the first set of frames as shown, for example, in FIG. 4B). Thus, the circuitry 202 may determine the one or more projected 2D positions, based on the intersection of the determined set of grid lines 424A.

At 428, the circuitry 202 may be configured to estimate a first rotation value of the plurality of rotation values and a first translation value of the plurality of translation values, for each imaging device, based on the initial 3D coordinates of the lighting device 106 and the determined center of each light of the grid of lights 108 in the first set of frames. In some embodiments, the circuitry 202 may estimate the first rotation value and the first translation value, of each imaging device, based on the initial 3D coordinates of the lighting device 106 and the determined one or more projected 2D positions of the center of each light.

In an exemplary scenario, the initial 3D coordinates of the lighting device 106 may be known. In such scenario, the circuitry 202 may determine the first rotation value and the first translation value corresponding to each imaging device. For example, the circuitry 202 may determine the first rotation value and the first translation value corresponding to the first imaging device 104A. Similarly, the circuitry 202 may determine the first rotation value and the first translation value corresponding to the second imaging device 104B, and the Nth imaging device 104N. The first rotation value and the first translation value corresponding to each imaging device may be with respect to the common 3D coordinates (such as the initial 3D coordinates) of the lighting device 106.

In accordance with an embodiment, the circuitry 202 may be further configured to estimate the first rotation value and the first translation value of the plurality of rotation values and the plurality of translation values, for each imaging device of the plurality of imaging devices 104, based on a perspective-n-point (PnP) technique. The PnP technique may utilize the initial 3D coordinates of the lighting device 106 and the corresponding one or more projected 2D positions of the center of each light in the first set of frames to estimate the first rotation value and the first translation value. Each imaging device of the plurality of imaging devices 104 may achieve 6 degrees-of-freedom (DOF). Thus, the PnP technique may be utilized to determine the first rotation value that may include values corresponding to roll, pitch, and yaw of each imaging device, and the first translation value.

At 430, the circuitry 202 may control the emission of light from the lighting device 106 based on a control signal (i.e. included in the one or more control signals). The emitted light may include a continuous light pulse corresponding to the control signal. The control signals may enable the lighting device 106 to emit the continuous light pulse for a specific time period.

In accordance with an embodiment, for the control of the emission of the light from the lighting device 106 based on the control signal, the circuitry 202 may activate the grid of lights 108 of the lighting device 106 to emit the light. The circuitry 202 may further deactivate the edge light 110 of the lighting device 106, at the time of activation of the grid of lights 108. For example, the circuitry 202 may activate the grid of lights 108 of the lighting device 106 for the specific time period to emit the continuous light pulse. The grid of lights 108 may be activated when the grid of lights 108 of the lighting device 106 may be in the field-of-view of the respective imaging device of the plurality of imaging devices 104.

At 432, the circuitry 202 may control the transformation of each imaging device of the plurality of imaging devices 104 for a first time period. Each imaging device may further capture a second set of images of the first plurality of images. For example, the circuitry 202 may control the transformation (i.e. rotation and/or translation) of each imaging device such that each imaging device may be able to capture the second set of images, when the grid of lights 108 of the lighting device 106 may be activated and in the field-of-view of the imaging device. In an exemplary scenario, the circuitry 202 may activate the grid of lights 108 to emit the continuous light pulse. The circuitry 202 may control the rotation and/or the translation of the first imaging device 104A towards the activated grid of lights 108. Further, the second set of images may be captured by the first imaging device 104A, based on the determination that the lighting device 106 may be in the field-of-view of the first imaging device 104A of the plurality of imaging devices 104. In a similar manner, the second set of images may be captured by each imaging device of the plurality of imaging devices 104 based on the determination that the lighting device 106 may be in the field-of-view of respective imaging device of the plurality of imaging devices 104.

At 434, a center of each light, of the grid of lights 108 of the lighting device 106, may be determined in the second set of images. The circuitry 202 may determine the center of each light, of the grid of lights 108, based on the light intensity in each image of the second set of images. For example, the circuitry 202 may determine the center of each light, of the grid of lights 108 in the second set of images, in a similar manner as the center of each light of the grid of lights 108 may be determined in the first set of frames of the first set of images (i.e. described, for example, at 412).

In some embodiments, the circuitry 202 may determine a set of features associated with each image of the second set of images. The set of features may be utilized to determine a correspondence between objects in the second set of images for calibration (or spatial synchronization) of the plurality of imaging devices 104. For example, the set of features may be determined based on a scale-invariant feature transform (SIFT) technique. In one or more embodiments, the set of features may be determined based on an oriented FAST and rotated BRIEF (ORB) technique applied on the second set of images.

At 436, the circuitry 202 may be further configured to estimate the plurality of rotation values and the plurality of translation values of each imaging device, based on the determined 3D coordinates of the lighting device 106 and the information about the emitted light included in the first plurality of images. In accordance with an embodiment, the circuitry 202 may estimate a second rotation value and a second translation value of the plurality of rotation values and the plurality of translation values, for each imaging device of the plurality of imaging devices 104, based on the determined 3D coordinates of the lighting device 106 and the determined center of each light of the grid of lights 108 of the lighting device in the second set of images. In some embodiments, the circuitry 202 may further utilize the set of features for estimation of the second rotation value and the second translation value. The plurality of rotation values and the plurality of translation values may include the estimated second rotation value and the second translation value for each imaging device of the plurality of imaging devices 104.

For example, the circuitry 202 may determine the second rotation value and the second translation value corresponding to each imaging device. For example, the circuitry 202 may determine the second rotation value and the second translation value corresponding to the first imaging device 104A. Similarly, the circuitry 202 may determine the second rotation value and the second translation value corresponding to the second imaging device 104B, and the Nth imaging device 104N. The second rotation value and the second translation value corresponding to each imaging device may be with respect to the common 3D coordinates (such as the initial 3D coordinates) of the lighting device 106. In accordance with an embodiment, the circuitry 202 may be further configured to estimate the second rotation value and the second translation value of the plurality of rotation values and the plurality of translation values, for each imaging device of the plurality of imaging devices 104, based on the PnP technique (i.e. described at 428).

At 438, the circuitry 202 may be further configured to apply the simultaneous localization and mapping (SLAM) process for each imaging device, based on the plurality of rotation values and the plurality of translation values (such as including the estimated second rotation value and the second translation value), for the spatial synchronization (or calibration) of the plurality of imaging devices 104. The circuitry 202 may input the determined set of features in a 3D map corresponding to the SLAM process, to determine a spatial scaling factor for each imaging device. Based on the determined set of features input in the 3D map and the estimated second rotation value and the second translation value, the circuitry 202 may apply the SLAM process for each imaging device of the plurality of imaging devices 104. Thus, the circuitry 202 of the disclosed electronic device 102 may allow accurate calibration (or spatial synchronization) of each imaging device by application of the SLAM process on the estimated second rotation value and the second translation value for each imaging device or on the plurality of rotation values and the plurality of translation values. Therefore, the plurality of imaging devices 104 may be automatically calibrated (or spatially synchronized) accurately, by utilization of the single lighting device 106. Thus, the disclosed electronic device 102 may enable calibration of the plurality of imaging devices 104 by use of the single lighting device (such as the lighting device 106). The light emitted by the lighting device 106 may be utilized to spatially synchronize the plurality of imaging devices 104 (as described, for example, at 402-438), thereby, providing an easy-to-implement setup that may guarantee accuracy in the calibration. Moreover, in the conventional systems, measurement targets, such as checkerboard patterned-boards and identifiable markers may be utilized for the spatial synchronization of the plurality of imaging devices, use of which may be time-consuming and inefficient to achieve the calibration. In contrast, the disclosed electronic device 102 may eliminate a usage of such measurement targets to calibrate the plurality of imaging devices, and may further calibrate the plurality of imaging devices 104 based on the determination of the extrinsic parameters (i.e. rotation and translation) of each imaging device based on the information included in the light emitted by the lighting device 106. Therefore, the disclosed electronic device 102 may provide a time-effective and efficient spatial synchronization of the plurality of imaging devices 104 and of the images/videos captured by the plurality of imaging devices 104.

Although the diagram 400 is illustrated as discrete operations, such as 402, 404, 406, 408, 410, 412, 414, 416, 418, 420, 422, 424, 426, 428, 430, 432, 434, 436, and 438, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 5:
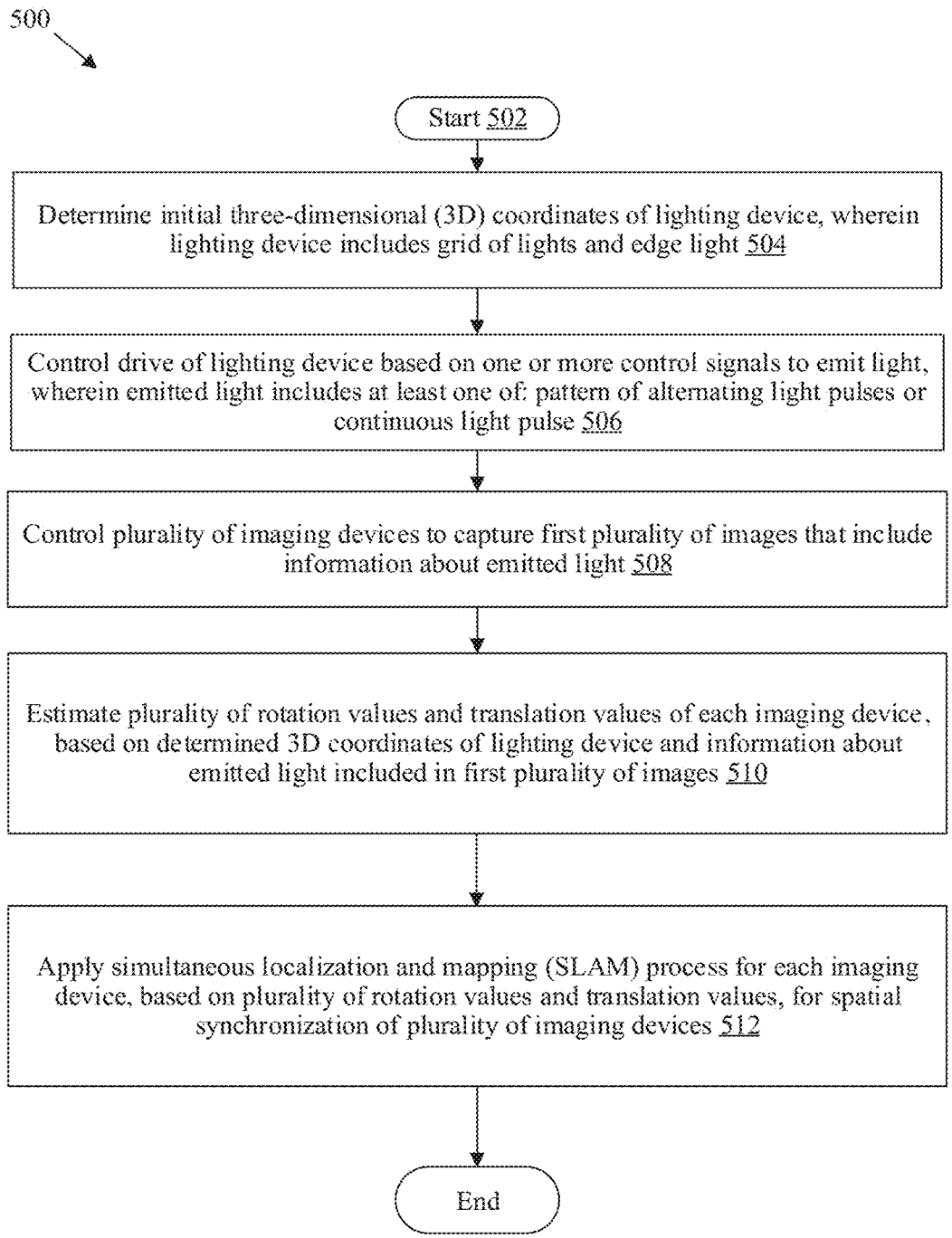
FIG. 5 is a flowchart that illustrates an exemplary method for spatial synchronization of videos, in accordance with an embodiment of the disclosure.

FIG. 5 is a flowchart that illustrates an exemplary method for spatial synchronization of videos, in accordance with an embodiment of the disclosure. FIG. 5 is explained in conjunction with elements from FIGS. 1, 2, 3, 4A, 4B, and 4C. With reference to FIG. 5, there is shown a flowchart 500. The operations of the flowchart 500 may be executed by a computing system, such as the electronic device 102 or the circuitry 202. The operations may start at 502 and proceed to 504.

At 504, the initial 3D coordinates of the lighting device 106 may be determined. The lighting device 106 may include the grid of lights 108 and the edge light 110. In accordance with an embodiment, the circuitry 202 may be configured to determine the initial 3D coordinates of the lighting device 106 as described, for example, in FIG. 4A (at 402).

At 506, the emission of light from the lighting device 106 may be controlled based on the one or more control signals. The emitted light may include at least one of the pattern of alternating light pulses or the continuous light pulse. In accordance with an embodiment, the circuitry 202 may be configured to control the emission of light from the lighting device 106 based on the one or more control signals (i.e. including the synchronization signal 300) as described, for example, in FIG. 4A (at 408).

At 508, the plurality of imaging devices 104 may be controlled to capture the first plurality of images that may include the information about the emitted light. In accordance with an embodiment, the circuitry 202 may be configured to control the plurality of imaging devices 104 to capture the first plurality of images that may include the information about the emitted light as described, for example, in FIG. 4A (at 410).

At 510, the plurality of rotation values and the plurality of translation values of each imaging device may be estimated, based on the determined 3D coordinates of the lighting device 106 and the information about the emitted light included in the first plurality of images. In accordance with an embodiment, the circuitry 202 may be configured to estimate the plurality of rotation values and the plurality of translation values of each imaging device, based on the determined 3D coordinates of the lighting device 106 and the information about the emitted light included in the first plurality of images as described, for example, in FIGS. 4A-4C (at least at 428 and 436).

At 512, the simultaneous localization and mapping (SLAM) process may be applied for each imaging device, based on the plurality of rotation values and the plurality of translation values, for spatial synchronization of the plurality of imaging devices 104. In accordance with an embodiment, the circuitry 202 may be configured to apply the SLAM process for each imaging device, based on the plurality of rotation values and the plurality of translation values, for the spatial synchronization of the plurality of imaging devices 104 as described, for example, in FIG. 4C (at 438).

Although the flowchart 500 is illustrated as discrete operations, such as 504, 506, 508, 510, and 512, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium having stored thereon, computer-executable instructions that when executed by an electronic device (the electronic device 102) causes the electronic device 102 to execute operations. The operations may include determination of initial three-dimensional (3D) coordinates of a lighting device (such as the lighting device 106). The lighting device 106 may include a grid of lights (such as the grid of lights 108) and an edge light (such as the edge light 110). The operations may further include control of an emission of light from the lighting device 106 based on one or more control signals. The emitted light may include at least one of the pattern of alternating light pulses or the continuous light pulse. The operations may further include control of a plurality of imaging devices (such as the plurality of imaging devices 104) to capture a first plurality of images that may include information about the emitted light. The operations may further include estimation of a plurality of rotation values and a plurality of translation values of each imaging device, based on the determined 3D coordinates of the lighting device 106 and the information about the emitted light included in the first plurality of images. The operations may further include application of a simultaneous localization and mapping (SLAM) process for each imaging device, based on the plurality of rotation values and the plurality of translation values, for spatial synchronization of the plurality of imaging devices 104.

Exemplary aspects of the disclosure may include an electronic device (such as the electronic device 102). The electronic device 102 may include circuitry (such as the circuitry 202) that may be configured to determine initial three-dimensional (3D) coordinates of a lighting device (such as the lighting device 106). The lighting device 106 may include a grid of lights (such as the grid of lights 108) and an edge light (such as the edge light 110). The circuitry 202 may be further configured to control an emission of light from the lighting device 106 based on one or more control signals. The emitted light may include at least one of the pattern of alternating light pulses or the continuous light pulse. The circuitry 202 may be further configured to control a plurality of imaging devices (such as the plurality of imaging devices 104) to capture a first plurality of images that may include information about the emitted light. The circuitry 202 may be further configured to estimate a plurality of rotation values and a plurality of translation values of each imaging device, based on the determined 3D coordinates of the lighting device 106 and the information about the emitted light included in the first plurality of images. The circuitry 202 may be further configured to apply a simultaneous localization and mapping (SLAM) process for each imaging device, based on the plurality of rotation values and the plurality of translation values, for spatial synchronization of the plurality of imaging devices 104.

In accordance with an embodiment, the circuitry 202 may be further configured to generate a synchronization signal (such as the synchronization signal 300) that may include a preamble pulse (such as the preamble pulse 302) and sequence of alternating ON and OFF pulses (such as the sequence of alternating ON and OFF pulses 304). The one or more control signals may include the synchronization signal 300. The circuitry 202 may control the emission of light from the lighting device 106 based on the generated synchronization signal 300 that may include the pattern of alternating light pulses corresponding to the generated synchronization signal 300. In accordance with an embodiment, the circuitry 202 may be further configured to generate the synchronization signal 300 based on the set of parameters associated with each imaging device of the plurality of imaging devices 104. The set of parameters may include at least the frame rate of each imaging device of the plurality of imaging devices 104.

In accordance with an embodiment, for the control of the emission of the light from the lighting device 106 based on the generated synchronization signal 300, the circuitry 202 may be further configured to activate the grid of lights 108 of the lighting device 106 to generate the ON pattern of the pattern of alternating light pulses included in the emitted light. The circuitry 202 may further deactivate the grid of lights 108 of the lighting device 106 to generate the OFF pattern of the pattern of alternating light pulses included in the emitted light. The circuitry 202 may deactivate the edge light 110 of the lighting device 106.

In accordance with an embodiment, the circuitry 202 may be further configured to determine a first set of images of the first plurality of images that may include information about the pattern of alternating light pulses included in the emitted light. The circuitry 202 may determine the center of each light of the grid of lights 108 of the lighting device 106 in a first set of frames of the first set of images. The first set of frames may include the ON pattern of the pattern of alternating light pulses. The circuitry 202 may further estimate a first rotation value and a first translation value of the plurality of rotation values and the plurality of translation values, for each imaging device, based on the 3D coordinates of the lighting device 106 and the determined center of each light of the grid of lights 108 in the first set of frames.

In accordance with an embodiment, the circuitry 202 may be further configured to control the plurality of imaging devices 104 to capture the first set of images based on the determination that the lighting device 106 may be in the field-of-view of the respective imaging device of the plurality of imaging devices 104. In accordance with an embodiment, the circuitry 202 may be further configured to apply the set of post-processing operations on the first set of frames of the first plurality of images. The circuitry 202 may determine the center of each light of the grid of lights 108 of the lighting device 106 in the post-processed first set of frames of the first plurality of images.

In accordance with an embodiment, the circuitry 202 may be further configured to apply the neural network model on the first set of frames of the first plurality of images to determine a first frame. The first frame may include the information about the pattern of alternating light pulses. The circuitry 202 may further determine the center of each light of the grid of lights 108 of the lighting device 106 in the determined first frame of the first set of frames.

In accordance with an embodiment, the circuitry 202 may be further configured to control the lighting device 106 to activate the edge light 110 of the lighting device 106. The circuitry 202 may control the transformation of the lighting device 106 towards each imaging device of the plurality of imaging devices 104. The transformation may include at least one of the rotation or the translation of the lighting device 106. The circuitry 202 may control the plurality of imaging devices 104 to capture light emitted by the edge light 110, based on the transformation of the lighting device 106. The circuitry 202 may receive, from the plurality of imaging devices 104, a second plurality of images captured by the plurality of imaging devices 104. The received second plurality of images may include information about the light emitted by the edge light 110. The circuitry 202 may estimate a slope of the information about the light emitted by the edge light 110 in the second plurality of images captured by the plurality of imaging devices 104.

In accordance with an embodiment, the circuitry 202 may be further configured to determine a set of grid lines (such as the set of grid lines 424A) passing through the determined center of each light of the grid of lights 108 of the lighting device 106 in the first set of frames, based on the estimated slope of the information about the light emitted by the edge light in the second plurality of images. The circuitry 202 may further determine one or more projected 2D positions of the center of each light in the first set of frames, based on the intersection of the determined set of grid lines 424A. The circuitry 202 may estimate the first rotation value and the first translation value of the plurality of rotation values and the plurality of translation values, of each imaging device, based on the 3D coordinates of the lighting device 106 and the determined one or more projected 2D positions of the center of each light.

In accordance with an embodiment, the circuitry 202 may be further configured to estimate the first rotation value and the first translation value of the plurality of rotation values and the plurality of translation values, for each imaging device of the plurality of imaging devices, based on a perspective-n-point (PnP) technique. In accordance with an embodiment, the circuitry 202 may be further configured to determine the set of grid lines 424A passing through the determined center of each light of the grid of lights 108 in the first set of frames, based on the mathematical optimization function. In accordance with an embodiment, the circuitry 202 may be further configured to determine the set of grid lines 424A passing through the determined center of each light of the grid of lights 108 in the first set of frames based on the neural network model.

In accordance with an embodiment, the circuitry 202 may be further configured to control the emission of the light from the lighting device 106 based on the control signal. The emitted light may include the continuous light pulse corresponding to the control signal. The one or more control signals may include the control signal. In accordance with an embodiment, the circuitry 202 may be further configured to, for the control of the emission of the light from the lighting device 106 based on the control signal, activate the grid of lights 108 of the lighting device 106 to emit the light. The circuitry 202 may further deactivate the edge light 110 of the lighting device 106.

In accordance with an embodiment, the circuitry 202 may be further configured to control the transformation of each imaging device of the plurality of imaging devices 104 for a first time period. Each imaging device may capture a second set of images of the first plurality of images. The circuitry 202 may determine the center of each light, of the grid of lights 108 of the lighting device 106, in the second set of images. The second set of images may include information about the emitted light that may include the continuous light pulse. The circuitry 202 may estimate a second rotation value and a second translation value of the estimated plurality of rotation values and the plurality of translation values, for each imaging device of the plurality of imaging devices 104, based on the determined 3D coordinates of the lighting device 106 and the determined center of each light of the grid of lights 108 of the lighting device 106 in the second set of images. The circuitry 202 may further apply the SLAM process for each imaging device, based on the estimated second rotation value and the second translation value, for the spatial synchronization of the plurality of imaging devices 104. In accordance with an embodiment, the circuitry 202 may be further configured to control each imaging device of the plurality of imaging devices 104 to capture the second set of images, based on the determination that the lighting device 106 may be in the field-of-view of the respective imaging device of the plurality of imaging devices 104.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic device, comprising:
    circuitry communicatively coupled to a plurality of imaging devices and a lighting device, wherein the circuitry is configured to:
        determine initial three-dimensional (3D) coordinates of the lighting device, wherein the lighting device includes a grid of lights and an edge light;
        control an emission of light from the lighting device based on at least one control signal, wherein the emitted light includes at least one of a pattern of alternating light pulses or a continuous light pulse;
        control the plurality of imaging devices to capture a first plurality of images that include information about the emitted light;
        estimate a plurality of rotation values and a plurality of translation values of each imaging device, based on the determined initial 3D coordinates of the lighting device and the information about the emitted light;
        determine a first set of images of the first plurality of images that includes information about the pattern of alternating light pulses of the emitted light;
        determine a center of each light of the grid of lights of the lighting device in a first set of frames of the first set of images, wherein the first set of frames includes an ON pattern of the pattern of alternating light pulses;
        estimate, based on the initial 3D coordinates of the lighting device and the determined center of each light of the grid of lights in the first set of frames, a first rotation value and a first translation value of the plurality of rotation values and the plurality of translation values for each imaging device of the plurality of imaging devices; and
        apply a simultaneous localization and mapping (SLAM) process for each imaging device of the plurality of imaging devices, based on the plurality of rotation values and the plurality of translation values, for spatial synchronization of the plurality of imaging devices.

2. The electronic device according to claim 1, wherein the circuitry is further configured to:
generate a synchronization signal that includes a preamble pulse and a sequence of alternating ON and OFF pulse, wherein the at least one control signal includes the synchronization signal; and
control the emission of light from the lighting device based on the generated synchronization signal that includes the pattern of alternating light pulses corresponding to the generated synchronization signal.

3. The electronic device according to claim 2, wherein
the circuitry is further configured to generate the synchronization signal based on a set of parameters corresponding to each imaging device of the plurality of imaging devices, and
the set of parameters includes at least a frame rate of each imaging device of the plurality of imaging devices.

4. The electronic device according to claim 2, wherein for the control of the emission of the light from the lighting device based on the generated synchronization signal, the circuitry is further configured to:
activate the grid of lights of the lighting device to generate an ON pattern of the pattern of alternating light pulses of the emitted light;
deactivate the grid of lights of the lighting device to generate an OFF pattern of the pattern of alternating light pulses of the emitted light; and
deactivate the edge light of the lighting device.

5. The electronic device according to claim 1, wherein the circuitry is further configured to control the plurality of imaging devices to capture the first set of images based on a determination that the lighting device is in a field-of-view of a respective imaging device of the plurality of imaging devices.

6. The electronic device according to claim 1, wherein the circuitry is further configured to:
apply a set of post-processing operations on the first set of frames of the first plurality of images; and
determine the center of each light of the grid of lights of the lighting device based on the applied set of post-processing operations on the first set of frames.

7. The electronic device according to claim 1, wherein the circuitry is further configured to:
apply a neural network model on the first set of frames of the first plurality of images to determine a first frame, wherein the first frame includes the information about the pattern of alternating light pulses; and
determine the center of each light of the grid of lights of the lighting device in the determined first frame of the first set of frames.

8. The electronic device according to claim 1, wherein the circuitry is further configured to:
control the lighting device to activate the edge light of the lighting device;
control a transformation of the lighting device towards each imaging device of the plurality of imaging devices, wherein the transformation includes at least one of a rotation or a translation of the lighting device;
control, based on the transformation of the lighting device, the plurality of imaging devices to capture light emitted by the edge light;
receive a second plurality of images from the plurality of imaging devices, wherein the received second plurality of images includes information about the light emitted by the edge light; and
estimate a slope of the information about the light emitted by the edge light in the second plurality of images.

9. The electronic device according to claim 8, wherein the circuitry is further configured to:
determine, based on the estimated slope of the information about the light emitted by the edge light in the second plurality of images, a set of grid lines that pass through the determined center of each light of the grid of lights of the lighting device in the first set of frames;
determine, based on an intersection of the determined set of grid lines, at least one projected 2D position of the center of each light in the first set of frames; and
estimate, based on the initial 3D coordinates of the lighting device and the determined at least one projected 2D position of the center of each light, the first rotation value and the first translation value of the plurality of rotation values and the plurality of translation values of each imaging device of the plurality of imaging devices.

10. The electronic device according to claim 1, wherein the circuitry is further configured to estimate, based on a perspective-n-point (PnP) technique, the first rotation value and the first translation value for each imaging device of the plurality of imaging devices.

11. The electronic device according to claim 9, wherein the circuitry is further configured to determine, based on a mathematical optimization function, the set of grid lines that pass through the determined center of each light of the grid of lights in the first set of frames.

12. The electronic device according to claim 9, wherein the circuitry is further configured to determine, based on a neural network model, the set of grid lines that pass through the determined center of each light of the grid of lights in the first set of frames.

13. The electronic device according to claim 1, wherein the circuitry is further configured to control the emission of the light from the lighting device based on a specific control signal, wherein
the emitted light includes the continuous light pulse corresponding to the specific control signal, and
the at least one control signal includes the specific control signal.

14. The electronic device according to claim 13, wherein, the circuitry is further configured to:
for the control of the emission of the light from the lighting device based on the specific control signal:
activate the grid of lights of the lighting device to emit the light; and
deactivate the edge light of the lighting device.

15. The electronic device according to claim 1, wherein the circuitry is further configured to:
control a transformation of each imaging device of the plurality of imaging devices for a first time period, wherein each imaging device captures a second set of images of the first plurality of images;
determine the center of each light of the grid of lights in the second set of images, wherein the second set of images includes information about the emitted light that includes the continuous light pulse;
estimate, based on the determined initial 3D coordinates of the lighting device and the determined center of each light of the grid of lights of the lighting device in the second set of images, a second rotation value and a second translation value of the estimated plurality of rotation values and the plurality of translation values for each imaging device of the plurality of imaging devices; and
apply the SLAM process for each imaging device, based on the estimated second rotation value and the second translation value, for the spatial synchronization of the plurality of imaging devices.

16. The electronic device according to claim 15, wherein the circuitry is further configured to control, based on a determination that the lighting device is in a field-of-view of a respective imaging device of the plurality of imaging devices, each imaging device of the plurality of imaging devices to capture the second set of images.

17. A method, comprising:
in an electronic device communicatively coupled to a plurality of imaging devices and a lighting device:
determining initial three-dimensional (3D) coordinates of the lighting device, wherein the lighting device includes a grid of lights and an edge light;
controlling an emission of light from the lighting device based on at least one control signal, wherein the emitted light includes at least one of a pattern of alternating light pulses or a continuous light pulse;
controlling the plurality of imaging devices to capture a first plurality of images that include information about the emitted light;
estimating a plurality of rotation values and a plurality of translation values of each imaging device, based on the determined 3D coordinates of the lighting device and the information about the emitted light of images;
determining a first set of images of the first plurality of images that includes information about the pattern of alternating light pulses of the emitted light;
determining a center of each light of the grid of lights of the lighting device in a first set of frames of the first set of images, wherein the first set of frames includes an ON pattern of the pattern of alternating light pulses;
estimating, based on the initial 3D coordinates of the lighting device and the determined center of each light of the grid of lights in the first set of frames, a first rotation value and a first translation value of the plurality of rotation values and the plurality of translation values for each imaging device of the plurality of imaging devices; and
applying a simultaneous localization and mapping (SLAM) process for each imaging device of the plurality of imaging devices, based on the plurality of rotation values and the plurality of translation values, for spatial synchronization of the plurality of imaging devices.

18. The method according to claim 17, further comprising:
generating a synchronization signal that includes a preamble pulse and a sequence of alternating ON and OFF pulse, wherein the at least one control signal includes the synchronization signal; and
controlling the emission of light from the lighting device based on the generated synchronization signal that includes the pattern of alternating light pulses corresponding to the generated synchronization signal.

19. A non-transitory computer-readable medium having stored thereon, computer-executable instructions that when executed by an electronic device, causes the electronic device to execute operations, the operations comprising:
determining initial three-dimensional (3D) coordinates of a lighting device coupled to the electronic device, wherein the lighting device includes a grid of lights and an edge light;
controlling an emission of light from the lighting device based on at least one control signal, wherein the emitted light includes at least one of a pattern of alternating light pulses or a continuous light pulse;
controlling a plurality of imaging devices, coupled to the electronic device, to capture a first plurality of images that include information about the emitted light;
estimating a plurality of rotation values and a plurality of translation values of each imaging device, based on the determined 3D coordinates of the lighting device and the information about the emitted light;
determining a first set of images of the first plurality of images that includes information about the pattern of alternating light pulses of the emitted light;
determining a center of each light of the grid of lights of the lighting device in a first set of frames of the first set of images, wherein the first set of frames includes an ON pattern of the pattern of alternating light pulses;
estimating, based on the initial 3D coordinates of the lighting device and the determined center of each light of the grid of lights in the first set of frames, a first rotation value and a first translation value of the plurality of rotation values and the plurality of translation values for each imaging device of the plurality of imaging devices; and
applying a simultaneous localization and mapping (SLAM) process for each imaging device of the plurality of imaging devices, based on the plurality of rotation values and the plurality of translation values, for spatial synchronization of the plurality of imaging devices.

* * * * *